(12) United States Patent
Pietsch et al.

(10) Patent No.: US 9,574,100 B2
(45) Date of Patent: Feb. 21, 2017

(54) COATED POLYMER FOILS WITH OXYGEN BARRIER PROPERTIES

(75) Inventors: Ines Pietsch, Speyer (DE); Axel Weiss, Speyer, DE (US); Kathrin Michl, Ludwigshafen (DE); Peter Preishuber-Pflügl, Mannheim (DE); Theo Smit, Heidelberg (DE)

(73) Assignee: BASF SE, Ludwigshafen (DE)

( * ) Notice: Subject to any disclaimer, the term of this patent is extended or adjusted under 35 U.S.C. 154(b) by 562 days.

(21) Appl. No.: 13/526,948

(22) Filed: Jun. 19, 2012

(65) Prior Publication Data

US 2012/0328870 A1  Dec. 27, 2012

Related U.S. Application Data

(60) Provisional application No. 61/499,717, filed on Jun. 22, 2011.

(51) Int. Cl.

| | | |
|---|---|---|
| *C09D 133/02* | (2006.01) | |
| *C09D 167/06* | (2006.01) | |
| *C09D 135/00* | (2006.01) | |
| *C08L 33/02* | (2006.01) | |
| *C08L 35/00* | (2006.01) | |
| *C08L 67/06* | (2006.01) | |
| *C08J 7/04* | (2006.01) | |
| *C08K 5/05* | (2006.01) | |
| *C08K 5/17* | (2006.01) | |
| *B32B 27/08* | (2006.01) | |
| *B32B 27/32* | (2006.01) | |
| *B32B 27/36* | (2006.01) | |
| *B32B 27/30* | (2006.01) | |
| *C09D 133/08* | (2006.01) | |

(52) U.S. Cl.
CPC ............. *C09D 133/02* (2013.01); *B32B 27/08* (2013.01); *B32B 27/30* (2013.01); *B32B 27/32* (2013.01); *B32B 27/36* (2013.01); *C08J 7/04* (2013.01); *C08J 7/047* (2013.01); *C08K 5/05* (2013.01); *C08L 33/02* (2013.01); *C08L 35/00* (2013.01); *C08L 67/06* (2013.01); *C09D 133/08* (2013.01); *C09D 135/00* (2013.01); *C09D 167/06* (2013.01); *B32B 2255/10* (2013.01); *B32B 2255/26* (2013.01); *B32B 2307/31* (2013.01); *B32B 2307/7244* (2013.01); *B32B 2333/00* (2013.01); *B32B 2367/00* (2013.01); *B32B 2405/00* (2013.01); *C08J 2333/02* (2013.01); *C08J 2335/00* (2013.01); *C08J 2367/02* (2013.01); *C08J 2433/02* (2013.01); *C08K 5/17* (2013.01); *Y10T 428/1379* (2015.01); *Y10T 428/265* (2015.01); *Y10T 428/28* (2015.01); *Y10T 428/2817* (2015.01); *Y10T 428/2848* (2015.01); *Y10T 428/31551* (2015.04); *Y10T 428/31565* (2015.04); *Y10T 428/31587* (2015.04); *Y10T 428/31725* (2015.04); *Y10T 428/31736* (2015.04); *Y10T 428/31757* (2015.04); *Y10T 428/31786* (2015.04); *Y10T 428/31797* (2015.04); *Y10T 428/31938* (2015.04)

(58) Field of Classification Search
None
See application file for complete search history.

(56) References Cited

U.S. PATENT DOCUMENTS

| | | | |
|---|---|---|---|
| 583,086 A | | 5/1897 | Richards |
| 651,088 A | | 6/1900 | Slane |
| 3,784,396 A | * | 1/1974 | Fourment et al. ............ 427/195 |
| 4,048,422 A | * | 9/1977 | Sackmann et al. ........... 526/203 |
| 4,235,981 A | * | 11/1980 | Tsuchiya ................... C08F 8/00 524/531 |
| 4,314,044 A | * | 2/1982 | Hughes ..................... C08F 2/10 524/781 |
| 4,390,672 A | * | 6/1983 | von Bonin ............ C08F 222/06 526/209 |
| 5,034,281 A | * | 7/1991 | Kawasaki ............... B32B 27/28 428/36.7 |
| 5,164,248 A | * | 11/1992 | Fleury et al. ................. 428/220 |
| 5,624,748 A | * | 4/1997 | Penzel ................. C09D 133/20 427/388.4 |
| 5,834,126 A | * | 11/1998 | Sheu ........................ B32B 25/08 428/515 |
| 6,071,994 A | * | 6/2000 | Hummerich et al. ........ 524/247 |
| 6,099,773 A | * | 8/2000 | Reck et al. .................... 264/109 |
| 6,146,746 A | * | 11/2000 | Reck ........................ C08K 5/17 181/284 |
| 6,596,386 B1 | * | 7/2003 | Reck et al. ................ 428/292.4 |
| 6,699,945 B1 | * | 3/2004 | Chen et al. .................... 525/445 |

(Continued)

FOREIGN PATENT DOCUMENTS

| | | |
|---|---|---|
| CN | 101970201 A | 2/2011 |
| DE | 25 01 123 A1 | 7/1976 |
| DE | 40 03 172 A1 | 8/1991 |
| EP | 0 116 930 A1 | 8/1984 |
| EP | 0 890 432 A1 | 1/1999 |
| EP | 1 391 443 * | 2/2004 |
| EP | 1 683 825 A1 | 7/2006 |

(Continued)

*Primary Examiner* — Vivian Chen
(74) *Attorney, Agent, or Firm* — Oblon, McClelland, Maier & Neustadt, L.L.P.

(57) ABSTRACT

A coated polymer foil is described and can be produced via coating of a polymer foil with an aqueous composition comprising (A) a polymer which is obtained via free-radical polymerization and which is composed of from 10 to 80% by weight of a compound selected from ethylenically unsaturated anhydrides and ethylenically unsaturated dicarboxylic acids, the carboxylic acid groups of which can form an anhydride group, and (B) an alkanolamine having at least two hydroxy groups. The coating gives the polymer foil an oxygen barrier and can in particular be used for producing packaging.

19 Claims, No Drawings

(56) References Cited

U.S. PATENT DOCUMENTS

| | | | |
|---|---|---|---|
| 7,303,797 B1 * | 12/2007 | Barsotti et al. | 428/36.7 |
| 7,511,098 B2 * | 3/2009 | Niederst et al. | 525/119 |
| 7,524,900 B2 * | 4/2009 | Nishiura | B32B 27/08 524/2 |
| 7,766,975 B2 * | 8/2010 | Clamen et al. | 8/115.51 |
| 8,536,259 B2 * | 9/2013 | Carbo et al. | 524/423 |
| 2003/0104211 A1 * | 6/2003 | Masuda | C23C 18/1216 428/411.1 |
| 2004/0037957 A1 * | 2/2004 | Niederst et al. | 427/248.1 |
| 2004/0058157 A1 * | 3/2004 | Ishikawa | C08J 7/04 428/411.1 |
| 2005/0027057 A1 * | 2/2005 | Dias | B60C 1/0008 524/445 |
| 2005/0129930 A1 * | 6/2005 | Berlin | B32B 27/10 428/331 |
| 2010/0210802 A1 * | 8/2010 | Creamer | C08F 220/06 526/271 |
| 2011/0027534 A1 * | 2/2011 | Ogawa et al. | 428/153 |
| 2013/0046055 A1 * | 2/2013 | Michl et al. | 524/734 |

FOREIGN PATENT DOCUMENTS

| | | | |
|---|---|---|---|
| EP | 2 014 730 A1 | | 1/2009 |
| JP | 2002-194265 | * | 7/2002 |
| JP | 2006-035804 | * | 2/2006 |
| WO | WO 97/31036 A1 | | 8/1997 |
| WO | WO 98/09813 A1 | | 3/1998 |
| WO | WO 98/31719 A1 | | 7/1998 |
| WO | WO 03/068869 A2 | | 8/2003 |
| WO | WO 2005/037898 A1 | | 4/2005 |
| WO | WO 2007/002322 A1 | | 1/2007 |

* cited by examiner

COATED POLYMER FOILS WITH OXYGEN BARRIER PROPERTIES

This application claims benefit of Provisional U.S. Application 61/499,717, filed Jun. 22, 2011.

The invention relates to coated polymer foils which can be produced via coating of polymer foils with an aqueous composition comprising (A) a polymer which is obtained via free-radical polymerization and which is composed of from 10 to 80% by weight of ethylenically unsaturated anhydrides and ethylenically unsaturated dicarboxylic acids, the carboxylic acid groups of which can form an anhydride group, and (B) an alkanolamine having at least two hydroxy groups. The coating gives the polymer foil an oxygen barrier and can in particular be used for producing packaging.

When products susceptible to oxidation or oxygen-sensitive products are packaged it is important that the packaging materials used have oxygen barrier properties, i.e. that they have minimum oxygen transmission and minimum oxygen permeability. Polymer foils used as packaging materials and by way of example made of polyolefins, such as polyethylene or oriented polypropylene, or of polyesters, e.g. polyethylene terephthalate, generally have relatively high oxygen permeability per se, in uncoated form, and various measures have therefore been proposed for increasing the oxygen barrier properties of these packaging materials.

WO 03/068869 describes a process for producing means of packaging with oxygen barrier properties, where a backing material is coated with a polymerizable compound, and the compound is then polymerized on the backing material. EP 2 014 730 describes a coating composition for forming a gas barrier film based on a polycarboxylic acid polymer, which is crosslinked by means of a zinc compound. WO 07/002,322 describes coated polymer films with oxygen barrier properties. The coating composition is a solution of a maleic acid/acrylic acid copolymer and of a vinyl alcohol/vinylamine copolymer. After the coating process, the two copolymers of the coating composition crosslink on the polymer film. WO 98/31719 describes coating compositions for barrier coatings. The compositions comprise an ethylenically unsaturated acid monomer and a polyamine which comprises an incorporated crosslinking agent. After the coating process, crosslinking takes place via triggering of a free-radical-initiated polymerization process. Coatings with oxygen barrier properties or with gas barrier properties are also described in EP 890432 (WO 98/09813) and EP 1683825 (WO 2005/037898).

Packaging foils disclosed hitherto with oxygen barrier properties are not yet entirely satisfactory. The oxygen permeabilities are often still not sufficiently low for all applications, or barrier coatings with polymer-based films are excessively brittle and lack sufficient flexibility, and the risk of cracking means that there is no guarantee of a durable barrier effect. When buckling or creasing occurs, there is a risk of damage to the barrier film in the region of creases, resulting in inadequate barrier effects. Oxygen barrier layers based on chlorine-free polymers having acid groups often exhibit acceptable barrier effects when humidity is low, but the barrier effect often decreases markedly at relatively high humidity (relative humidity greater than 80%). Heavy metal salts are required in order to form some of the known barrier layers, and for health-related reasons this is often undesirable in particular for applications in the sector of packaging for food and drink. Other known coating compositions are 2-component systems in which two components have to be kept separate prior to application to the substrate since they would otherwise crosslink prematurely, not being stable in storage as a single-component system.

It was an object of the present invention to provide further compositions and processes which permit production of packaging with good oxygen barrier properties, in particular also when humidity is relatively high and in the region of creases, buckling, and corners. This packaging should have maximum resistance to temperature change, flexibility, and antiblocking capability, and should have minimum content of any substances hazardous to health, e.g. metals. A particular requirement is the use of a coating composition single-component system which is free from chlorine, free from metal salt, and stable in storage.

The invention provides a coated polymer foil which can be produced via coating of a polymer foil with an aqueous composition comprising A) a polymer which is obtained via free-radical polymerization and which is composed of from 10 to 80% by weight of at least one compound selected from ethylenically unsaturated anhydrides and ethylenically unsaturated dicarboxylic acids, the carboxylic acid groups of which can form an anhydride group, and B) at least one alkanolamine having at least two hydroxy groups.

The invention also provides the use of the abovementioned aqueous composition in order to produce or reinforce an oxygen barrier on polymer foils.

The coating produced in the invention has oxygen barrier properties. The permeability test described in the examples can be used to measure the barrier properties. The expression "oxygen barrier property" means that oxygen transmission and, respectively, oxygen permeability have been reduced in comparison with those of uncoated substrate. The oxygen permeability of polymer foils coated in the invention is preferably less than 30%, in particular less than 20% or less than 10%, e.g. from 1% to 3% of the value of the uncoated polymer foil (measured at 23° C. and 0% relative humidity).

The aqueous composition to be used in the invention comprises a polymer A) which is composed of from 10 to 80% by weight, preferably from 10 to 50% by weight, particularly preferably from 15 to 40% by weight, of an ethylenically unsaturated anhydride or of an ethylenically unsaturated dicarboxylic acid whose carboxylic acid groups can form an anhydride group (hereinafter termed monomers a)). Preferred anhydrides are dicarboxylic anhydrides. Suitable ethylenically unsaturated dicarboxylic acids are generally those having carboxylic acid groups on adjacent carbon atoms. The carboxylic acid groups can also be present in the form of their salts. Preferred monomers a) are maleic acid, maleic anhydride, itaconic acid, 1,2,3,6-tetrahydrophthalic acid, 1,2,3,6-tetrahydrophthalic anhydride, the alkali metal and ammonium salts thereof, or a mixture of these materials. Particular preference is given to maleic acid and maleic anhydride.

The polymer can also comprise monomers b) alongside monomers a). Examples of monomers b) that can be used are: monoethylenically unsaturated C3- to C10-monocarboxylic acids, (monomers b1), e.g. acrylic acid, methacrylic acid, ethylacrylic acid, allylacetic acid, crotonic acid, vinylacetic acid, maleic hemiesters, such as monomethyl maleate, mixtures of these and the alkali metal and ammonium salts of these, linear 1-olefins, branched-chain 1-olefins, or cyclic olefins (monomers b2), e.g. ethene, propene, butene, isobutene, pentene, cyclopentene, hexene, cyclohexene, octene, 2,4,4-trimethyl-1-pentene optionally in a mixture with 2,4,4-trimethyl-2-pentene, C8-C10-olefin, 1-dodecene, C12-C14-olefin, octadecene, 1-eicosene (C20), C20-C24-olefin; oligoolefins produced with metallocene catalysis and having a terminal double bond, e.g. oligopropene, oligohexene, and oligooctadecene; olefins produced via cationic polymerization and having high alpha-olefin content, e.g. polyisobutene, vinyl and allyl alkyl ethers having from 1 to 40 carbon atoms in the alkyl moiety, where the alkyl moiety can also bear further substituents, such as a hydroxy group, an amino or dialkylamino group, or one or more alkoxylate groups (monomers b3), e.g. methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and also the corresponding allyl ethers and mixtures of these. Acrylamides and alkyl-substituted acrylamides (monomers b4), e.g. acrylamide, methacrylamide, N-tert-butylacrylamide, N-methyl(meth)acrylamide, monomers containing sulfo groups (monomers b5), e.g. allylsulfonic acid, methallylsulfonic acid, styrenesulfonate, vinylsulfonic acid, allyloxybenzenesulfonic acid, 2-acrylamido-2-methyl-propanesulfonic acid, the corresponding alkali metal or ammonium salts of these, and mixtures of these. C1- to C8-alkyl esters or C1- to C4-hydroxyalkyl esters of acrylic acid, methacrylic acid, or maleic acid, or esters of C1- to C18-alcohols, alkoxylated with from 2 to 50 mol of ethylene oxide, propylene oxide, butylene oxide, or a mixture of these, with acrylic acid, methacrylic acid, or maleic acid (monomers b6), e.g. methyl(meth)acrylate, ethyl(meth)acrylate, propyl(meth)acrylate, isopropyl(meth)acrylate, butyl (meth)acrylate, hexyl(meth)acrylate, 2-ethylhexyl(meth) acrylate, hydroxyethyl(meth)acrylate, hydroxypropyl(meth) acrylate, 1,4-butanediol monoacrylate, dibutyl maleate, ethyldiglycol acrylate, methylpolyglycol acrylate (11 EO), (meth)acrylic esters of C13/C15-oxo alcohol reacted with 3, 5, 7, 10, or 30 mol of ethylene oxide, and mixtures of these, alkylaminoalkyl(meth)acrylates or alkylaminoalkyl(meth) acrylamides, or quaternization products of these (monomers b7), e.g. 2-(N,N-dimethylamino)ethyl(meth)acrylate, 3-(N, N-dimethylamino)propyl(meth)acrylate, 2-(N,N,N-trimethylammonium)ethyl(meth)acrylate chloride, 2-dimethylaminoethyl-(meth)acrylamide, 3-dimethylaminopropyl(meth) acrylamide, 3-trimethylammoniumpropyl(meth)-acrylamide chloride, vinyl and allyl esters of C1- to C30-monocarboxylic acids (monomers b8), e.g. vinyl formate, vinyl acetate, vinyl propionate, vinyl butyrate, vinyl valerate, vinyl 2-ethylhexanoate, vinyl nonoate, vinyl decanoate, vinyl pivalate, vinyl palmitate, vinyl stearate, vinyl laurate. Further monomers b9 that may be mentioned are: N-vinylformamide, N-vinyl-N-methylformamide, styrene, [alpha]methylstyrene, 3-methylstyrene, butadiene, N-vinylpyrrolidone, N-vinylimidazole, 1-vinyl-2-methylimidazole, 1-vinyl-2-methylimidazoline, N-vinylcaprolactam, acrylonitrile, methacrylonitrile, allyl alcohol, 2-vinylpyridine, 4-vinylpyridine, diallyldimethylammonium chloride, vinylidene chloride, vinyl chloride, acrolein, methacrolein, and vinylcarbazole, and mixtures thereof.

The polymer can also comprise, alongside monomers a), from 20 to 90% by weight of monomers b. It is preferable that the polymer also comprises, alongside monomers a), amounts of from 50 to 90% by weight, particularly from 60% to 85% by weight, of monomers b. Preferred monomers b are acrylic acid, methacrylic acid, ethene, propene, butene, isobutene, cyclopentene, methyl vinyl ether, ethyl vinyl ether, acrylamide, 2-acrylamido-2-methylpropanesulfonic acid, vinyl acetate, styrene, butadiene, acrylonitrile, or a mixture thereof. Particular preference is given to acrylic acid, methacrylic acid, ethene, acrylamide, styrene, and acrylonitrile, or a mixture thereof. Very particular preference is given to acrylic acid, methacrylic acid, and acrylamide, or a mixture thereof.

In one embodiment of the invention, the polymer is composed of from 10 to 80% by weight of maleic acid or maleic anhydride. In one embodiment of the invention, the polymer A is composed of from 20 to 40% by weight of maleic acid or maleic anhydride and of from 60 to 80% by weight of acrylic acid and/or methacrylic acid, and the crosslinking process uses from 20 to 40 parts by weight of alkanolamine B for every 100 parts by weight of polymer A.

The polymers can be produced by conventional polymerization processes, e.g. via bulk polymerization, emulsion polymerization, suspension polymerization, dispersion polymerization, precipitation polymerization, or solution polymerization. Suitable polymerization processes are described in WO 97/31036. The polymerization processes specified preferably operate with the exclusion of oxygen, preferably in a stream of nitrogen. All of the polymerization methods use the conventional apparatuses, e.g. stirred tanks, stirred tank cascades, autoclaves, tubular reactors, and kneaders. It is preferable to use the solution polymerization, emulsion polymerization, precipitation polymerization, or suspension polymerization method of operation. Particular preference is given to the following methods: solution polymerization and emulsion polymerization. The polymerization process can be carried out in solvents or diluents, e.g. toluene, o-xylene, p-xylene, cumene, chlorobenzene, ethylbenzene, industrial mixtures of alkylaromatics, cyclohexane, industrial aliphatic mixtures, acetone, cyclohexanone, tetrahydrofuran, dioxane, glycols and glycol derivatives, polyalkylene glycols and derivatives of these, diethyl ether, tert-butyl methyl ether, methyl acetate, isopropanol, ethanol, water, or a mixture, e.g. isopropanol/water mixture. It is preferable that the solvent or diluent used comprises water optionally with up to 60% by weight content of alcohols or glycols. It is particularly preferable to use water. The polymerization process can be carried out at temperatures of from 20 to 300° C., preferably from 60 to 200° C. Weight-average molecular weights depend on the selection of the polymerization conditions and can be set by way of example to from 800 to 5 000 000, in particular from 1000 to 1 000 000. It is preferable that the weight-average molecular weights Mw are above 5000. Particular preference is given to weight-average molecular weights of from 5000 to 500 000 or from 10 000 to 200 000. Mw is determined via gel permeation chromatography.

The polymerization process is preferably carried out in the presence of compounds (initiators) that form free radicals. The amount needed of said compounds is up to 30% by weight, preferably from 0.05 to 15% by weight, particularly preferably from 0.2 to 8% by weight, based on the monomers used in the polymerization process. In the case of multicomponent initiator systems (e.g. redox initiator systems), the weight data above are based on the entirety of the components. Examples of suitable polymerization initiators are peroxides, hydroperoxides, peroxydisulfates, percarbonates, peroxyesters, hydrogen peroxide, and azo compounds. Examples of initiators, which can be water-soluble or water-insoluble, are hydrogen peroxide, dibenzoyl peroxide, dicyclohexyl peroxydicarbonate, dilauroyl peroxide, methyl ethyl ketone peroxide, di-tert-butyl peroxide, acetylacetone peroxide, tert-butyl hydroperoxide, cumenehydroperoxide, tert-butyl perneodecanoate, tert-amyl perpivalate, tert-butyl perpivalate, tert-butyl perneohexanoate, tert-butyl 2-ethylperhexanoate, tert-butyl perbenzoate, lithium peroxydisulfate, sodium peroxydisulfate, potassium peroxydisulfate, and ammonium peroxydisulfate, azodiisobutyronitrile, 2,2'-azobis(2-amidinopropane)dihydrochloride, 2-(carbamoylazo) isobutyronitrile, and 4,4-azobis(4-cyanovaleric acid). The initiators can be used alone or in a mixture with one another, examples being mixtures of hydrogen peroxide and sodium peroxydisulfate. For the polymerization process in an aqueous medium it is preferable to use water-soluble initiators. The known redox initiator systems can also be used as polymerization initiators. These redox initiator systems comprise at least one peroxide-containing compound in combination with a redox coinitiator, e.g. sulfur compounds having reducing effect, for example bisulfites, sulfites, thiosulfates, dithionites, and tetrathionates of alkali metals and ammonium compounds. It is therefore possible to use combinations of peroxodisulfates with alkali metal hydrogensulfites or with ammonium hydrogensulfites, examples being ammonium peroxydisulfate and ammonium disulfite. The amount of the peroxide-containing compound as a ratio to that of the redox coinitiator is from 30:1 to 0.05:1.

In order to produce polymers with low average molecular weight, it is often advantageous to carry out the copolymerization process in the presence of regulators. Conventional regulators can be used for this purpose, examples being organic compounds comprising SH groups, e.g. 2-mercaptoethanol, 2-mercaptopropanol, mercaptoacetic acid, tert-butyl mercaptan, n-octyl mercaptan, n-dodecyl mercaptan, and tert-dodecyl mercaptan, C1- to C4-aldehydes, such as formaldehyde, acetaldehyde, propionaldehyde, hydroxyammonium salts, such as hydroxyammonium sulfate, formic acid, sodium bisulfite, or isopropanol. The amounts used of the polymerization regulators are generally from 0.1 to 10% by weight, based on the monomers. It is also possible to use the selection of the appropriate solvent to influence the average molecular weight. By way of example, polymerization in the presence of diluents having benzylic H atoms reduces average molecular weight via chain transfer.

In order to produce copolymers of relatively high molecular weight, it is often advantageous in the polymerization reaction to operate in the presence of crosslinking agents. These crosslinking agents are compounds having two or more ethylenically unsaturated groups, for example diacrylates or dimethacrylates of at least dihydric saturated alcohols, e.g. ethylene glycol diacrylate, ethylene glycol dimethacrylate, propylene glycol 1,2-diacrylate, propylene glycol 1,2-dimethacrylate, 1,4-butanediol diacrylate, 1,4-butanediol dimethacrylate, hexanediol diacrylate, hexanediol dimethacrylate, neopentyl glycol diacrylate, neopentyl glycol dimethacrylate, 3-methylpentanediol diacrylate, and 3-methylpentanediol dimethacrylate. Crosslinking agents used can also comprise the acrylic and methacrylic esters of alcohols having more than 2 OH groups, e.g. trimethylolpropane triacrylate or trimethylolpropane trimethacrylate. Another class of crosslinking agents is that of diacrylates or dimethacrylates of polyethylene glycols or of polypropylene glycols with molecular weights in each case from 200 to 9000. The molecular weight of polyethylene glycols or polypropylene glycols used for producing the diacrylates or dimethacrylates is preferably in each case from 400 to 2000. Materials that can be used other than the homopolymers of ethylene oxide or of propylene oxide are block copolymers of ethylene oxide and propylene oxide, or copolymers of ethylene oxide and propylene oxide comprising a random distribution of the ethylene oxide units and propylene oxide units. Other materials suitable for producing the crosslinking agents are the oligomers of ethylene oxide or of propylene oxide, e.g. diethylene glycol diacrylate, diethylene glycol dimethacrylate, triethylene glycol diacrylate, triethylene glycol dimethacrylate, tetraethylene glycol diacrylate, and/or tetraethylene glycol dimethacrylate. Other suitable crosslinking agents are vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallylsucrose, methylenebis(meth)acrylamide, divinylethyleneurea, divinylpropyleneurea, divinylbenzene, divinyldioxane, triallyl cyanurate, tetraallylsilane, tetravinylsilane, and bis- or polyacrylic siloxanes (e.g. Tegomer products from Th. Goldschmidt AG). The amounts preferably used of the crosslinking agents are from 10 ppm to 5% by weight, based on the monomers to be polymerized.

If operations use the emulsion polymerization, precipitation polymerization, suspension polymerization, or dispersion polymerization method, it can be advantageous to stabilize the polymer droplets or polymer particles by using surfactant auxiliaries. Emulsifiers or protective colloids are typically used for this purpose. It is possible to use anionic, nonionic, cationic, and amphoteric emulsifiers. Examples of anionic emulsifiers are alkylbenzenesulfonic acids, sulfonated fatty acids, sulfosuccinates, fatty alcohol sulfates, alkylphenolsulfates, and fatty alcohol ether sulfates. Examples of nonionic emulsifiers that can be used are alkylphenol ethoxylates, primary alcohol ethoxylates, fatty acid ethoxylates, alkanolamide ethoxylates, fatty amine ethoxylates, EO/PO block copolymers, and alkylpolyglucosides. Examples of cationic or amphoteric emulsifiers used are: quaternized amine alkoxylates, alkylbetaines, alkylamidobetaines, and sulfobetaines. Examples of typical protective colloids are cellulose derivatives, polyethylene glycol, polypropylene glycol, copolymers of ethylene glycol and propylene glycol, polyvinyl acetate, polyvinyl alcohol, polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolidin-2-one, polyvinyl-2-methylimidazoline, and copolymers comprising maleic acid or comprising maleic anhydride, as described by way of example in DE 25 01 123. The concentrations usually used of the emulsifiers or protective colloids are from 0.05 to 20% by weight, based on the monomers.

If the polymerization process is carried out in aqueous solution or a diluent, the monomers can be completely or to some extent neutralized by bases prior to or during the polymerization process. Examples of bases that can be used are alkali metal compounds or alkaline earth metal compounds, e.g. sodium hydroxide, potassium hydroxide, calcium hydroxide, magnesium oxide, sodium carbonate; ammonia; primary, secondary, and tertiary amines, e.g. ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine, or morpholine. It is also possible to use polybasic amines for the neutralization process, e.g. ethylenediamine, 2-diethylaminoethylamine, 2,3-diaminopropane, 1,2-propylenediamine, dimethylaminopropylamine, neopentanediamine, hexamethylenediamine, 4,9-dioxadodecane-1,12-diamine, polyethyleneimine, and polyvinylamine. Compounds preferably used for the partial or complete neutralization of the ethylenically unsaturated carboxylic acids prior to or during the polymerization process are ammonia, triethanolamine, and diethanolamine. It is particularly preferable that the ethylenically unsaturated carboxylic acids are not neutralized prior to and during the polymerization process. It is also preferable that no neutralizing agent, other than the alkanolamine B), is added after the polymerization process.

The polymerization process can be carried out continuously or batchwise by a wide variety of different methods. In the usual method, a portion of the monomers is used as initial charge optionally in a suitable diluent or solvent and optionally in the presence of an emulsifier, of a protective colloid, or of other auxiliaries, the system is inertized, and the temperature is increased until the desired polymerization temperature has been reached. However, it is also possible to use just one suitable diluent as initial charge. Within a defined period, the free-radical initiator, further monomers, and other auxiliaries, e.g. regulators or crosslinking agents, are metered into the mixture, optionally in a diluent. The feed times selected can be different. By way of example, the feed time selected for the initiator feed can be longer than for the monomer feed. If the polymer is obtained by the solution polymerization process in water, there is generally no need to remove the solvent. However, by way of example, a spray drying process can be carried out if the intension is to isolate the polymer. If the solution polymerization, precipitation polymerization, or suspension polymerization method is used to produce the polymer in a steam-volatile solvent or solvent mixture, the solvent can be removed via introduction of steam, with the aim of obtaining an aqueous solution or dispersion. Another method of removing the polymer from the organic diluent uses a drying process.

It is preferable that the polymers A) take the form of an aqueous dispersion or solution with solids contents which are preferably from 10 to 80% by weight, in particular from 40 to 65% by weight.

Polymer A) can also be obtained via grafting of maleic acid or maleic anhydride, or of a monomer mixture comprising maleic acid or maleic anhydride, on to a graft base. Examples of suitable graft bases are monosaccharides, oligosaccharides, modified polysaccharides, and alkyl polyglycol ethers. These graft polymers are described by way of example in DE 40 03 172 and EP 116 930.

Alkanolamines having at least two OH groups are used as component B). Preference is given to alkanolamines of the formula

   (I)

in which $R^1$ is an H atom, a C1-C10-alkyl group, or a C1-C10-hydroxyalkyl group, and $R^2$ and $R^3$ are a C1-C10-hydroxyalkyl group. It is particularly preferably that $R^2$ and $R^3$ are mutually independently a C2-C5-hydroxyalkyl group and that $R^1$ is an H atom, a C1-C5-alkyl group, or a C2-C5-hydroxyalkyl group. Examples of compounds of the formula I that may be mentioned are diethanolamine, triethanolamine, diisopropanolamine, triisopropanolamine, methyldiethanolamine, butyldiethanolamine, and methyldiisopropanolamine. Particular preference is given to triethanolamine.

To produce the aqueous composition to be used in the invention, it is preferable to use the polymer A) and the alkanolamine B) in a ratio to one another such that the molar ratio of carboxy groups of component A) and the hydroxy groups of component B) is from 20:1 to 1:1, preferably from 8:1 to 5:1, and particularly preferably from 5:1 to 1.7:1 (where the anhydride groups are counted as 2 carboxy groups). In a simple example of the production of the aqueous composition to be used in the invention, the alkanolamine is added to the aqueous dispersion or solution of the polymers A).

The aqueous compositions to be used in the invention preferably comprise less than 1.0% by weight, particularly less than 0.5% by weight, and very particularly less than 0.3% by weight, in particular less than 0.1% by weight, based on the entirety of A)+B), of a reaction accelerator comprising phosphorus. Reaction accelerators comprising phosphorus are specified in U.S. Pat. Nos. 651,088 and 583,086. These in particular involve alkali metal hypophosphites, alkali metal phosphites, alkali metal polyphosphates, alkali metal dihydrogenphosphates, polyphosphoric acid, hypophosphoric acid, phosphoric acid, alkylphosphinic acid, or oligomers or, respectively, polymers of said salts and acids. The aqueous compositions to be used in the invention preferably comprise no reaction accelerators comprising phosphorus or no amounts of a compound comprising phosphorus that are effective for reaction acceleration. The aqueous compositions to be used in the invention can comprise an esterification catalyst, e.g. sulfuric acid or p-toluenesulfonic acid.

The aqueous compositions to be used in the invention can comprise the polymer A) and the alkanolamine B) as sole constituents in water. However, the aqueous compositions can also comprise further additives suitable for the respective intended use. Examples that can be used are wetting aids, dyes, pigments, biocides, plasticizers, thickeners for adjustment of rheology, adhesion promoters, reducing agents, and transesterification catalysts.

In one embodiment of the invention, the aqueous composition to be used in the invention comprises an amount which is preferably from 2 to 40% by weight of lamellar pigments. Examples of lamellar pigments are phyllosilicates, in particular talc powder, clay, or mica. Talc powder is preferred. Preferred shape factors (length:thickness ratio) are greater than 10.

The invention further provides a process for producing or reinforcing an oxygen barrier effect on a backing substrate. The backing substrates involve polymer foils, where the backing substrate is directly or indirectly coated with an aqueous composition described in more detail above. After coating with the aqueous composition, the polymer foil is dried and is heated to at least 100° C., preferably to at least 130° C., e.g. to from 140 to 180° C., in order to initiate the crosslinking reaction. The heating period is preferably from 3 seconds to 60 minutes, in particular from 3 seconds to 10 minutes.

After crosslinking, the polymer foil of the invention has a coating in which the polymer has been crosslinked by way of ester bonds between acid groups of the polymer A and hydroxy groups of the alkanolamine B.

After drying (at 50° C., 72 hours) to give a film of thickness from 0.3 to 1 mm, and then 15 minutes of curing at 130° C. in air, the gel content of the aqueous compositions to be used in the invention is preferably above 50% by weight, particularly preferably above 60% by weight, very particularly preferably above 70% by weight, and in particular above 75% by weight. The method of determining gel content here is that after conclusion of the curing process the cured films are stored at 23° C. in water for 48 hours. Soluble content remains in the water here. The film is then dried to constant weight at 50° C., and weighed. The weight corresponds to the gel content, which is calculated in % by weight, based on the weight prior to removal of the soluble content. Constant weight has been reached when weight loss is less than 0.5% by weight over a period of 3 hours.

Foils which are examples of polymer foils suitable as backing material are foils made of polyester, e.g. polyethylene terephthalate, and foils made of polyolefins, polyamide, polystyrene, or polyvinyl chloride. Preferred polymer foils are foils made of polyethylene terephthalate, oriented polypropylene, or polyethylene, where the polyethylene can have been produced from ethylene either by the high-pressure polymerization process or by the low-pressure polymerization process, or those made of biodegradable aliphatic-aromatic copolyesters. Particular preference is given to foils made of polyethylene terephthalate. Examples of biodegradable foils are foils made of biodegradable aliphatic-aromatic copolyesters and/or polylactic acid, e.g. Ecoflex® foils or Ecovio® foils. Examples of suitable copolyesters are those formed from alkanediols, in particular C2- to C8-alkanediols, e.g. 1,4-butanediol, from aliphatic dicarboxylic acids, in particular C2- to C8-dicarboxylic acids, e.g. adipic acid, and from aromatic dicarboxylic acids, e.g. terephthalic acid.

The thickness of the backing foils is generally in the range from 10 to 200 µm, in the case of foils made of polyamide from 30 to 50 µm, in the case of foils made of polyethylene terephthalate from 10 to 40 µm, in the case of foils made of polyvinyl chloride about 100 µm, and in the case of foils made of polystyrene about 30-75 µm.

An example of a method of application in coating machines is application of the coating composition to a backing foil made of a plastic. To the extent that materials in web form are used, the aqueous composition can be applied from a trough by way of an applicator roll and leveled with the aid of an air brush. Preferred application processes for coating the foils involve doctor systems, wire-wound doctor bars, air brushes, reverse-roll application processes, reverse gravure coating, curtain coating, or a die or die head.

The crosslinking initiated via the heating process can take place directly after the coating process or else at a later juncture, for example in the reeled state after materials in web form have been coated, dried, and reeled.

Incorporation of free-radical-generating UV initiators into the polymer or addition of these as additive to the aqueous composition can lead to additional crosslinking, where the polymer foil is irradiated with UV light after the coating process.

Previous Corona treatment of the backing foil and/or coating with a primer can be used to achieve a further improvement in adhesion on a foil. Examples of the amounts of material applied to the polymer foils are preferably from 0.25 to 10 g (of polymer, solid) per m², preferably from 0.5 to 7 g/m². After application of the aqueous composition to the backing material, the solvent is evaporated. To this end it is possible by way of example in the case of continuous operation to pass the material through a drying tunnel which can have been equipped with an infrared irradiation device. The coated and dried material is then conducted over a cooling roll and is finally reeled. The thickness of the dried coating is preferably at least 0.5 µm, e.g. from 0.5 to 50 µm, particularly preferably from 0.5 to 20 µm.

The coated polymer foils exhibit excellent barrier effect with respect to oxygen, in particular even when relative humidity is relatively high, for example greater than or equal to 80% or greater than or equal to 85%. The coated polymer foils can be used per se as packaging or portion of packaging, for example for the packaging of food or drink. The coatings have very good mechanical properties and exhibit, for example, good blocking performance, and in essence exhibit no cracking.

In order to give the means of packaging specific surface properties or specific coating properties, for example good printability, further improved sealing performance and further improved blocking performance, and good water resistance, it can be advantageous to overcoat the coated substrates with outer layers which additionally provide these desired properties. The coated foils can be overcoated by repeating a process set out above, or can be repeatedly coated in a continuous process without intermediate reeling and unreeling of the foil. The location of the oxygen barrier layer is thus in the interior of the system, and the surface properties are then determined by the outer layer. The invention also provides coated polymer foils where the polymer foils have been coated not only with the barrier layer of the invention but also with at least one adhesive layer or with at least one sealable layer. It is also possible to use the coated foil to produce a laminate composed of a plurality of foils. Here again, the location of the oxygen barrier layer is preferably in the interior of the system.

EXAMPLES

The aqueous coating compositions can be produced as described in WO 97/31036.

Measurement of Oxygen Barrier Effect:

Oxygen transmission and, respectively, oxygen permeability were determined on coatings on polymer foils at the relative humidity respectively stated. This method begins by measuring oxygen transmission, and then recalculates this on the basis of a layer thickness of 1 µm and states it as oxygen permeability with the unit $(cm^3 \times 1\ \mu m)/(m^2 \times d \times bar)$, where d is the time in days. The determination method is based on ASTM D3985.

Example B1

(Comparison, without Alkanolamine)

Polymer foil: polyethylene terephthalate, thickness 36 µm

Aqueous Coating Composition:

Polymer made of 75 parts by weight of acrylic acid and 25 parts by weight of maleic acid Weight-average molar mass: 80 000 g/mol Solid content: 50% by weight in water Example B2

Polymer foil: polyethylene terephthalate, thickness 36 µm

Aqueous Coating Composition:

Polymer made of 75 parts by weight of acrylic acid and 25 parts by weight of maleic acid Weight-average molecular mass: 80 000 g/mol 30 parts by weight of triethanolamine for every 100 parts by weight of polymer Solids content: 50% by weight in water The polymer foils were coated with the aqueous coating compositions, using a layer thickness (after drying) of 6 µm (example 1) or 10 µm (example 2). The crosslinking was achieved via heating to 160° C. for 30 minutes.

Oxygen barrier effect was in each case measured at 0% and 85% relative humidity. Table 1 collates the results.

TABLE 1

Oxygen barrier measurement results

| | Crosslinking agent | Oxygen transmission at 0% RH [cm³/m²/d] | Oxygen transmission at 85% RH [cm³/m²/d] | Oxygen permeability at 0% RH [(cm³ × 1 µm)/ (m² × d × bar)] | Oxygen permeability at 85 RH [(cm³ × 1 µm)/ (m² × d × bar)] |
|---|---|---|---|---|---|
| B1 | — | 1.5 | 43.5 | 9.2 | no barrier |
| B2 | Triethanolamine | 0.1 | 0.2 | 1.1 | 1.6 |

The invention claimed is:

1. A coated polymer foil produced via coating of a polymer foil in an oxygen permeability-reducing amount with an aqueous composition consisting of water, and:
   (A) a polymer which is obtained via free-radical polymerization and which comprises from 10 to 80% by weight of at least one compound selected from ethylenically unsaturated anhydrides and ethylenically unsaturated dicarboxylic acids, the carboxylic acid groups of which can form an anhydride group;
   (B) at least one alkanolamine having at least two hydroxy groups; and
   (C) optionally at least one selected from the group consisting of a wetting aid, a dye, a pigment, a biocide, a plasticizer, a thickener, an adhesion promoter, a reducing agent, and a transesterification catalyst, wherein the pigment is not a lamellar pigment,
   wherein the aqueous composition contains a single polymer, which is polymer (A), and
   wherein the oxygen permeability of the coated polymer foil is less than 30% of the oxygen permeability value of the uncoated polymer foil, measured at 23° C. and 0% relative humidity, according to ASTM D3985.

2. The polymer foil according to claim 1, wherein, after the coating process, the coated polymer foil with the aqueous composition is dried and heated to at least 100° C.

3. The polymer foil according to claim 1, wherein the polymer foil has a coating in which the polymer has been crosslinked by way of ester bonds between acid groups of the polymer (A) and hydroxy groups of the alkanolamine (B).

4. The polymer foil according to claim 1, wherein the polymer (A) is composed of from 10 to 80% by weight of maleic acid or maleic anhydride.

5. The polymer foil according to claim 1, wherein the alkanolamine (B) involves a compound $NR^1R^2R^3$ in which $R^1$ is an H atom, a C1-C10-alkyl group, or a C1-C10-hydroxyalkyl group, and $R^2$ and $R^3$ are a C1-C10-hydroxyalkyl group.

6. The polymer foil according to claim 1, wherein the alkanolamine (B) involves triethanolamine.

7. The polymer foil according to claim 1, where the molar ratio of the carboxy groups and anhydride groups (where an anhydride group is counted as two carboxy groups) of the polymer (A) to the hydroxy groups of the alkanolamine (B) is from 20:1 to 1:1.

8. The polymer foil according to claim 1, wherein the gel content of the aqueous composition after drying and 15 minutes of curing at 130° C. is greater than 50% by weight.

9. The polymer foil according to claim 1, wherein the thickness of the coating is at least 0.5 µm.

10. The polymer foil according to claim 1, wherein the backing material for the polymer film is selected from the group consisting of polyethylene terephthalate, oriented polypropylene, polyethylene, and biodegradable aliphatic-aromatic copolyesters.

11. The polymer foil according to claim 1, wherein the polymer foil is packaging or a portion of packaging.

12. The polymer foil according to claim 1, wherein the polymer foil is further coated with at least one adhesive layer or with at least one sealable layer.

13. The polymer foil according to claim 1, wherein the polymer (A) is composed of from 20 to 40% by weight of maleic acid or maleic anhydride and of from 60 to 80% by weight of acrylic acid and/or methacrylic acid, and from 20 to 40 parts by weight of alkanolamine (B) have been used for every 100 parts by weight of polymer (A).

14. The polymer foil according to claim 1, wherein said oxygen permeability is less than 20% of said oxygen permeability value of the uncoated polymer foil.

15. The polymer foil according to claim 1, wherein said oxygen permeability is less than 10% of said oxygen permeability value of the uncoated polymer foil.

16. The polymer foil according to claim 1, wherein said oxygen permeability is from 1% to 3% of said oxygen permeability value of the uncoated polymer foil.

17. The polymer foil according to claim 1, wherein the polymer (A) consists of 20 to 40% by weight of maleic acid or maleic anhydride and 60 to 80% by weight of acrylic acid and/or methacrylic acid.

18. An oxygen barrier coating on a polymer foil, wherein the oxygen barrier coating is made from an aqueous composition consisting of water, and:
   (A) a polymer which is obtained via free-radical polymerization and which comprises from 10 to 80% by weight of at least one compound selected from ethylenically unsaturated anhydrides and ethylenically unsaturated dicarboxylic acids, the carboxylic acid groups of which can form an anhydride group;
   (B) at least one alkanolamine having at least two hydroxy groups; and
   (C) optionally at least one selected from the group consisting of a wetting aid, a dye, a pigment, a biocide, a plasticizer, a thickener, an adhesion promoter, a reducing agent, and a transesterification catalyst, wherein the pigment is not a lamellar pigment,
   wherein the aqueous composition contains a single polymer, which is polymer (A), and
   wherein the oxygen permeability of the coated polymer foil is less than 30% of the oxygen permeability value of the uncoated polymer foil, measured at 23° C. and 0% relative humidity, according to ASTM D3985.

19. A process for producing or reinforcing an oxygen barrier effect on a backing substrate selected from polymer foils, where the backing substrate is directly or indirectly coated with an aqueous composition consisting of water, and:
   (A) a polymer which is obtained via free-radical polymerization and which comprises from 10 to 80% by weight of at least one compound selected from ethylenically unsaturated anhydrides and ethylenically unsaturated dicarboxylic acids, the carboxylic acid groups of which can form an anhydride group;

(B) at least one alkanolamine having at least two hydroxy groups; and
(C) optionally at least one selected from the group consisting of a wetting aid, a dye, a pigment, a biocide, a plasticizer, a thickener, an adhesion promoter, a reducing agent, and a transesterification catalyst, wherein the pigment is not a lamellar pigment,
wherein, after the coating process, the coated polymer foil with the aqueous composition is dried and heated to at least 130° C.,
wherein the aqueous composition contains a single polymer, which is polymer (A), and
wherein the oxygen permeability of the coated polymer foil is less than 30% of the oxygen permeability value of the uncoated polymer foil, measured at 23° C. and 0% relative humidity, according to ASTM D3985.

* * * * *